United States Patent [19]
Rouleau et al.

[11] Patent Number: 5,399,855
[45] Date of Patent: Mar. 21, 1995

[54] ATMOSPHERIC EXCLUSION SYSTEM HAVING AN EXPANDABLE SHROUD AND A NON-ELASTIC BLADDER

[75] Inventors: Bruce S. Rouleau, Rossmoor; Andrew J. Tuls, Lakewood, both of Calif.

[73] Assignee: Northrop Grumman Corporation, Los Angeles, Calif.

[21] Appl. No.: 169,475

[22] Filed: Dec. 16, 1993

[51] Int. Cl.$^6$ ............................................. H01J 5/02
[52] U.S. Cl. .................................. 250/239; 128/202.11
[58] Field of Search ............. 250/239, 237 G, 231.19; 128/200.28, 202.11, 201.15, 202.13, 201.19, 206.21; 244/3.16

[56] References Cited

U.S. PATENT DOCUMENTS

| | | |
|---|---|---|
| 2,465,764 | 3/1949 | Underhill, Jr. . |
| 3,226,836 | 1/1966 | Bond . |
| 4,300,496 | 11/1981 | Price ................................ 128/202.13 |
| 4,315,432 | 2/1982 | Newton . |
| 4,501,152 | 2/1985 | Wetterhorn et al. . |
| 4,771,299 | 9/1988 | Gell, Jr. . |
| 4,771,320 | 9/1988 | Gell . |
| 4,853,722 | 8/1989 | Gell, Jr. . |
| 4,947,783 | 8/1990 | Gell, Jr. . |
| 4,951,698 | 8/1990 | Grosso . |
| 4,980,707 | 12/1990 | Gell, Jr. . |
| 5,129,389 | 7/1992 | Tauscher et al. ............... 128/202.11 |

Primary Examiner—David C. Nelms
Assistant Examiner—Que T. Le
Attorney, Agent, or Firm—Terry J. Anderson; Karl J. Hoch, Jr.

[57] ABSTRACT

An automatic, isobaric, atmospheric exclusion system is disclosed to protect sensitive optical components on-board aircraft. A lightly sealed shroud is disposed around the optical component and connected to a non-elastic bladder by a flexible hose.

12 Claims, 1 Drawing Sheet

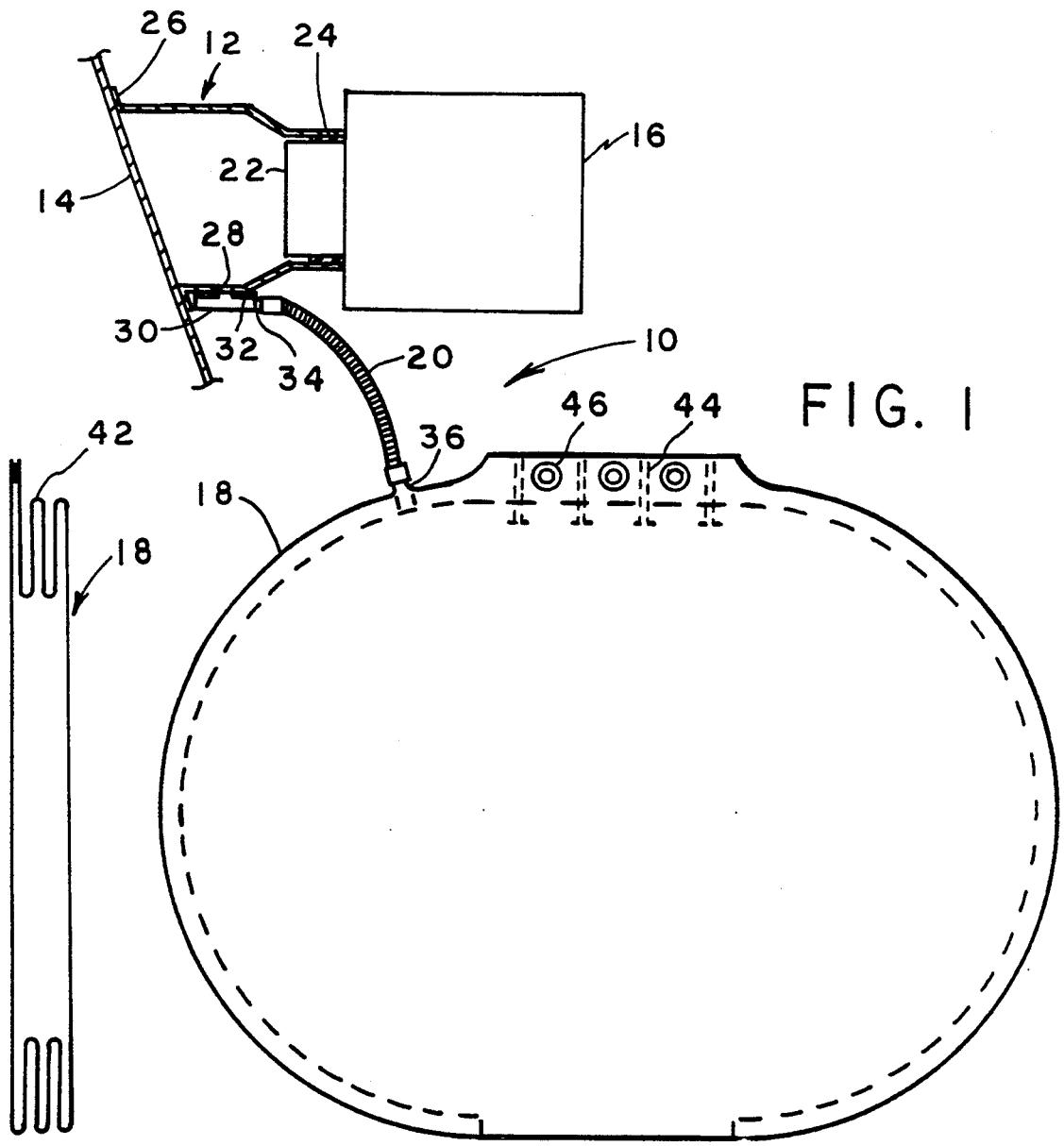
FIG. 1
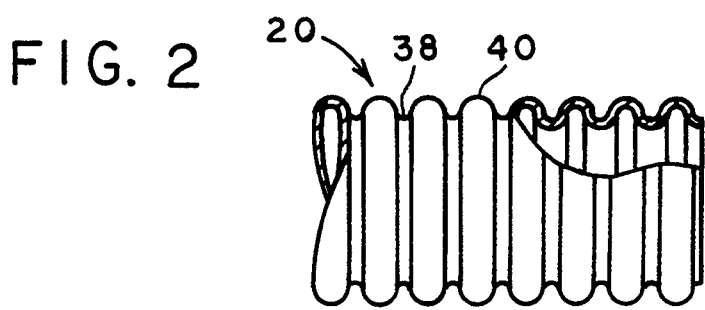
FIG. 2
FIG. 3

5,399,855

ATMOSPHERIC EXCLUSION SYSTEM HAVING AN EXPANDABLE SHROUD AND A NON-ELASTIC BLADDER

This invention was made under U.S. AIR FORCE Contract F33657-86-C-3001 and the U.S. Government has certain rights therein.

BACKGROUND OF THE INVENTION

This invention relates generally to a system to protect sensitive optical components during flight on an airborne system and more particularly to an automatic, isobaric, atmospheric exclusion system for such components on aircraft or missiles.

When sensitive optical instruments and components are utilized on aircraft, they must be protected from water vapor, moisture and any other volatile condensable materials to prevent degradation of performance or damage. Such a protection system must be capable of functioning under severe environmental extremes of temperature and pressure without imparting significant pressure onto the optics or their window. It must remain operational during intermittent usage and after long periods of storage.

There exists, therefore, a significant need for an improved atmospheric exclusion system wherein the system is automatic and isobaric. The present invention fulfills these needs and provides further related advantages.

SUMMARY OF THE INVENTION

In accordance with the invention, an improved atmospheric exclusion system for protecting optical components during flight is provided which includes a shroud lightly sealed around the optical component to be protected. The shroud includes a viewing window for the optical components and a hose connection for connecting with a flexible hose to a hose connection on a non-elastic bladder. When atmospheric pressure decreases, the air in the shroud expands and is directed to the bladder through the hose and when atmospheric pressure increases the air is returned to the shroud.

Because the bladder is of minimal thickness material, no significant pressure differential is created within the system during expansion or contraction with the only pressure differential introduced as the air is transferred through the flexible hose. Any moisture, water vapor, or other volatile condensible materials in the system can be removed by an in-line dessicant cannister in the system. Since the system will initially include only a small volume of gas it will function isobarically throughout its entire operational envelope regardless of assembly site temperature and atmospheric conditions and will not create any adverse pressure gradients on the optical components.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the present invention. In such drawings:

FIG. 1 is a schematic plan view, partially in section, of the atmospheric exclusion system of the present invention;

FIG. 2 is a side elevation view of the bladder for the atmospheric exclusion system of the present invention; and FIG. 3 is a side view, partially in section, of the flexible, non-collapsible hose used in the atmospheric exclusion system of the present invention.

DETAILED DESCRIPTION OF THE PREFERRED EMBODIMENT

The automatic, isobaric, atmospheric exclusion system 10 of the present invention is generally illustrated in FIG. 1. The system 10 comprises a shroud 12 enclosing the volume between an optical window 14 and an optical sensor 16 connected to a zero pressure, non-elastic collapsible/expandable bladder 18 by means of a flexible, non-collapsible convoluted hose 20. The shroud 12 is lightly sealed (no large clamping forces) around the sensor optics 22 of the optical sensor 16 with a rubber bulb or gasket 24 and includes a circumferential tab 26 which is cemented or otherwise affixed in an air-tight juncture with the underside of the optical window 14 to create an air tight sealed cavity around the optical sensor optics 22.

The shroud 12 further includes a threaded opening 28 for a flat, pancake, dessicant in-line cannister 30 which is threaded into opening 28 with a gasket 32. The cannister 30 includes a hose connection tube 34 extending from a lateral side thereof. The flexible, non-collapsible hose 20 fits over the hose connection tube 34 and may be clamped if necessary. The bladder 18 likewise includes a hose connection 36 over which the other end of the hose 20 is fitted and/or clamped.

The hose 20, illustrated in more detail in FIG. 3, is flexible and non-collapsible and for military applications must meet military standard specification MIL-T 81914/2. Having outer diameter sections 40 alternating with lesser diameter sections 38 throughout its convoluted length, the hose 20 is extremely flexible yet totally air tight.

The zero pressure, collapsible/expandable bladder 18 is of the accordian type having a plurality of pleats 42 as best shown in FIG. 2. At the top, the bladder 18 includes a hanger strap 44 and circular cut-outs 46 to provide strength and enable the bladder to be conveniently hung.

The materials necessary to assure integrity of the automatic, isobaric, atmospheric exclusion system 10 for the temperature extremes as well as long life must suit the requirements of the system. A typical application requires materials to remain flexible without cracking from temperature extremes of −65 degrees F. to 200 degrees F., and to maintain moisture exclusion for long periods of time exposed to an atmosphere of 30% relative humidity as well as short periods of time exposed to an atmosphere of 100% humidity.

The shroud 12 may be constructed of an S2 fiberglass and polyester resin or molded from high density polyethylene and sealed to the window 14 with a low water vapor transmissive sealant. A polytetrafluoroethylene (TFE) is suitable for the hose 20 while the bladder 18 may be constructed of polychloroltriflouralethylene (CTFE). Both TFE and CTFE have excellent temperature resistance and low water vapor transmission properties. If necessary for strength and the intended environment, the bladder 18 may be laminated.

In its initial state at sea level, the bladder 18 is collapsed to a minimum volume and the only air in the system 10 is the initial volume enclosed within the shroud 12, hose 20, and bladder 18. As the system 10 ascends in altitude, and the ambient atmospheric pressure decreases, the air enclosed by the shroud 12 begins to expand. To prevent a pressure differential from acting on the optical sensor 16 or the window 14, the excess volume of air is ducted, via the hose 20, to the expandible bladder 18.

As the system 10 descends the inverse occurs. The air in the system 10 begins to compress as the atmospheric pressure increases and the air previously transferred to the bladder 18 is withdrawn back into the shroud 12, thus allowing pressure equalization within the system 10. By the same process the system 10 also has the capability of compensating for volume changes induced by temperature variations.

The bladder 18, because it is constructed of minimal thickness material, does not create any significant pressure differential within the system 10 due to expansion or contraction. The only pressure differential of significance is introduced by the pressure drop created as the air is transferred through the flexible hose 20. This pressure drop can be minimized through proper sizing of the hose 20 to the expected flow rates induced by ambient pressure changes with respect to time (climb/descent rates).

The bladder 18 would be sized for the maximum expected altitude to be encountered. Any moisture, water vapor, or other volatile condensible materials in the system 10 are removed by the dessicant in the cannister 30. Thus, the optical sensor 16 will remain uncontaminated as long as the system 10, namely the shroud 12, hose 20, and bladder 18 remain intact.

The bladder 18 may include an integral breather cloth (not shown) if necessary to insure that it can be fully evacuated without trapping any air. In addition, a second port and hose connection can be added to the shroud 12 to allow purging of the system 10 after assembly and installation without violating any of the system seals. In any event the system 10 will initially include only a small volume of gas thereby allowing it to function isobarically throughout its entire operational envelope regardless of assembly site temperature and atmospheric conditions. In operation, the system 10 is capable of operating without creating any adverse pressure gradients on the optical sensor 16.

Since the bladder 18 is non-elastic, pressure sealing requirements in the system 10 are minimal. They are only required to counter pressure drops due to flow transfer between the shroud 12 and the bladder 18. No external power is required for system operation and only minimal weight is added. No pressurized gas storage, diaphragms, or valves are required. The system 10 is inherently passive and self-regulating.

A wide variety of modifications and improvements to the atmospheric exclusion system described herein are believed to be apparent to those skilled in the art. Accordingly, no limitation on the present invention is intended by way of the description herein, except as set forth in the appended claims.

What is claimed is:

1. An atmospheric exclusion system for protecting optical components during flight, comprising:
    a shroud lightly sealed around the optical components to be protected, said shroud including a viewing window for the optical components and a hose connection thereon;
    a non-elastic bladder having a hose connection; and
    a flexible hose connected at one end to the hose connection on said shroud and at the other end to the hose connection on said bladder, whereby when atmospheric pressure decreases, the air in said shroud expands and is directed to said bladder through said hose and when atmospheric pressure increases the air is returned to said shroud.

2. An atmospheric exclusion system for protecting optical components during flight, comprising:
    a shroud lightly sealed around the optical components to be protected, said shroud including a viewing window for the optical components and a small opening therein;
    a dessicant filled cannister secured over said small opening in said shroud and including a hose connection;
    a non-elastic bladder having a hose connection; and
    a flexible hose connected at one end to the hose connection on said cannister and at the other end to the hose connection on said bladder, whereby when atmospheric pressure decreases, the air in said shroud expands and is directed to said bladder through said cannister and said hose and when atmospheric pressure increases the air is returned to said shroud.

3. The atmospheric exclusion system for protecting optical components during flight of claim 2 wherein said bladder is pleated.

4. The atmospheric exclusion system for protecting optical components during flight of claim 2 wherein said bladder is laminated.

5. The atmospheric exclusion system for protecting optical components during flight of claim 2 wherein said bladder contains a breather cloth.

6. The atmospheric exclusion system for protecting optical components during flight of claim 2 wherein said bladder is polychloroltriflouralethylene.

7. The atmospheric exclusion system for protecting optical components during flight of claim 2 wherein said hose is polytetrafluoroethylene.

8. The atmospheric exclusion system for protecting optical components during flight of claim 2 wherein said shroud is fiberglass and polyester resin.

9. The atmospheric exclusion system for protecting optical components during flight of claim 2 wherein said shroud is molded of high density polyethylene.

10. The atmospheric exclusion system for protecting optical components during flight of claim 2 wherein said shroud window is sealed to said shroud by a low water vapor transmissive sealant.

11. The atmospheric exclusion system for protecting optical components during flight of claim 2 wherein said shroud includes a second opening and hose connection to permit purging of the system after assembly.

12. An atmospheric exclusion system for protecting optical components during flight, comprising:
    a fiberglass and polyester resin shroud lightly sealed around the optical component to be protected, said shroud including a viewing window for the optical components and a small opening therein;
    a dessicant filled pancake cannister secured over said small opening in said shroud and including a hose connection on a lateral side thereof;
    a non-elastic polychloroltriflouralethylene laminated pleated bladder having a hose connection; and
    a flexible polytetrafluoroethylene hose connected at one end to the hose connection on the lateral side of said cannister and at the other end to the hose connection on said bladder, whereby when atmospheric pressure decreases, the air in said shroud expands and is directed to said bladder through said cannister and said hose and when atmospheric pressure increases the air is returned to said shroud.

* * * * *